(12) United States Patent
Pawlowski et al.

(10) Patent No.: US 10,315,115 B2
(45) Date of Patent: Jun. 11, 2019

(54) GAMING ENVIRONMENT REWARD SYSTEM

(71) Applicant: NIKE, Inc., Beaverton, OR (US)

(72) Inventors: Andy Pawlowski, Portland, OR (US); Willoughby H. Walling, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 640 days.

(21) Appl. No.: 14/550,536

(22) Filed: Nov. 21, 2014

(65) Prior Publication Data
US 2016/0144280 A1 May 26, 2016

(51) Int. Cl.
| | |
|---|---|
| G06Q 30/02 | (2012.01) |
| A63F 13/79 | (2014.01) |
| A63F 13/212 | (2014.01) |
| A63F 13/327 | (2014.01) |
| A63F 13/332 | (2014.01) |
| A63F 13/63 | (2014.01) |
| A63F 13/825 | (2014.01) |
| A63F 13/85 | (2014.01) |
| H04L 29/08 | (2006.01) |

(52) U.S. Cl.
CPC ............ *A63F 13/79* (2014.09); *A63F 13/212* (2014.09); *A63F 13/327* (2014.09); *A63F 13/332* (2014.09); *A63F 13/63* (2014.09); *A63F 13/825* (2014.09); *A63F 13/85* (2014.09); *H04L 67/22* (2013.01); *H04L 67/306* (2013.01)

(58) Field of Classification Search
CPC .................................................. G06Q 30/00
See application file for complete search history.

(56) References Cited

U.S. PATENT DOCUMENTS

| | | | | |
|---|---|---|---|---|
| 2004/0215524 | A1* | 10/2004 | Parkyn | G06Q 20/12 705/80 |
| 2008/0059304 | A1* | 3/2008 | Kimsey | A63F 13/12 705/14.12 |
| 2009/0144639 | A1* | 6/2009 | Nims | A63B 24/0059 715/757 |
| 2010/0069148 | A1* | 3/2010 | Cargill | A63B 71/0622 463/25 |

(Continued)

FOREIGN PATENT DOCUMENTS

WO 2014046561 A1 3/2014

OTHER PUBLICATIONS

Anonymous: "PlayStation Move—Wikipedia, the free encyclopedia", Jun. 27, 2010 (Jun. 27, 2010).

(Continued)

*Primary Examiner* — Eric R Netzloff
(74) *Attorney, Agent, or Firm* — Banner & Witcoff, Ltd.

(57) ABSTRACT

Systems and methods to track users' progression through an activity simulation, which may resemble related sporting events, are provided. One or more performance levels with respect to one or more measurable parameters may be monitored during the same or different times. Physical activity may be monitored. Exceeding a first performance level may provide an option to join a sponsoring organization and exceeding a second threshold (for the same or different parameter of interest) may result in transmitting a redemption code to a contact point for an option to obtain a physical item. The physical item may mimic equipment used in a simulated activity.

18 Claims, 6 Drawing Sheets

(56) References Cited

U.S. PATENT DOCUMENTS

2010/0223115 A1* 9/2010 Chodosh ............... G06Q 30/02
  705/14.12
2012/0315986 A1* 12/2012 Walling ................. A63F 13/10
  463/31

OTHER PUBLICATIONS

Casamassina Matt: "Wii Fit Review", May 19, 2008 (May 19, 2008).
May 6, 2016—(WO) ISR & WO—App PCT/US15/061870.

* cited by examiner

GAMING ENVIRONMENT REWARD SYSTEM

BACKGROUND

Simulation games, often in the form of graphics-based computer-implemented instructions stored on one or more non-transitory computer-readable mediums have evolved significantly. Modern simulation games and programs employ dazzling three-dimensional color images, and many offer elaborate storylines with sophisticated playing strategies. Further, increased processing power and network speeds have aided in the development and deployment of accurate physics engines that can mimic or at least better represent physical movements such of those of athletes. As a result, the popularity of simulation and role-playing programs increased dramatically the last few years.

BRIEF SUMMARY

The following presents a simplified summary of the present disclosure in order to provide a basic understanding of certain aspects. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of this disclosure relate to computerized systems and methods that may be used to track one or more users' progression through an activity simulation, which may simulate and/or resemble a sporting event or a plurality of related sporting events. The simulation may be provided over a network and utilize a gaming platform that logistically connects a plurality of users, which may be able to compete with at least one other user and/or AI opponent.

Certain embodiments may comprise a non-transitory computer-readable medium including computer-executable instructions that when executed by a processor are configured to perform one or more processes. In one embodiment, a platform may be utilized to display an activity simulation to the user. The simulation may be a sporting activity, such as allowing a user to virtually compete in a professional sporting match between two or more teams or individuals. Two or more users may compete or cooperate in one or more simulations. Users may choose to mimic a certain real-world player's statistics and/or may be represented by avatars having characteristics (e.g., visual and/or athletic) of actual players.

Certain implementations may register a user with a user profile associated with the activity simulation. The user profile may be linked to a gaming platform or environment, an environment linked to the virtual sporting events and/or other associations. For example, the user profile may be linked to an online community that is based upon hardware components being utilized and/or software, such as the actual simulation software regardless of the hardware component(s). In certain embodiments, the user profile may link two or more environments.

Control input data may be received from the user. The input data may be received from any of one or more input devices, which may be wired or wirelessly connected to provide an input. In one embodiment, systems and methods may be configured to interpret the control input data as one or more instructions for manipulating the activity simulation. The input data may be received as a direct result of physical activity, including but not limited to, physical activity of the user performing a sporting event similar to or related to the sporting event or activity being simulated.

A performance level of the activity simulation may be augmented or otherwise set based upon the one or more instructions. In certain embodiments, if the performance level exceeds a first threshold, the user may be presented with an option to associate the user profile with one of a plurality of sponsor organizations. The sponsor organizations may be actual real-world organizations and/or the sponsorship opportunity may be a real option for that organization.

In further embodiments, one or more performance levels may be monitored. The performance levels may be with respect to the same or different values being measured. The performance levels may monitor one or more values during the same or different time intervals (which may or may not overlap). Based on performance level exceeding a second threshold (for the same or different parameter of interest), the user or user profile of the user may be provided a redemption code to a contact point for an option to obtain a physical item. The redemption code may be conditioned and/or based on an association of the user profile with a first sponsor organization. The user profile may be associated with a first environment, and a redemption code may be transmitted to a contact point that is not associated with the user profile with the first environment. In various embodiments, the contact point may comprise one or more of an email address, a phone number, a social network account, a physical address, a geolocation, or determined from at least one of the above.

In certain embodiments, the user profile is not updated as a result of the user receiving the redemption code, and yet in another embodiment, the user profile is updated or augmented upon receiving the redemption code of the user exercising the option to use the redemption code. The redemption code may be configured to be used to redeem a reward of a physical product associated with the first sponsor organization.

In certain embodiments, the communicating of the redemption code, and/or determination whether the user met a threshold (e.g., the second threshold) may be based on the user declining an association with a second sponsor organization. The second sponsor organization may be a tangible organization, which may be a competitor with the first sponsor organization.

DETAILED DESCRIPTION

Aspects of this disclosure involve obtaining, storing, and/or processing athletic data relating to the physical movements of an athlete. The athletic data may be actively or passively sensed and/or stored in one or more non-transitory storage mediums. Still further aspects relate to using athletic data to generate an output, such as for example, calculated athletic attributes, feedback signals to provide guidance, and/or other information. These and other aspects will be discussed in the context of the following illustrative examples of a personal training system.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure. Further, headings within this disclosure should not be considered as limiting aspects of the disclosure and the example embodiments are not limited to the example headings.

I. Example Personal Training System

A. Illustrative Networks

Figure 1:
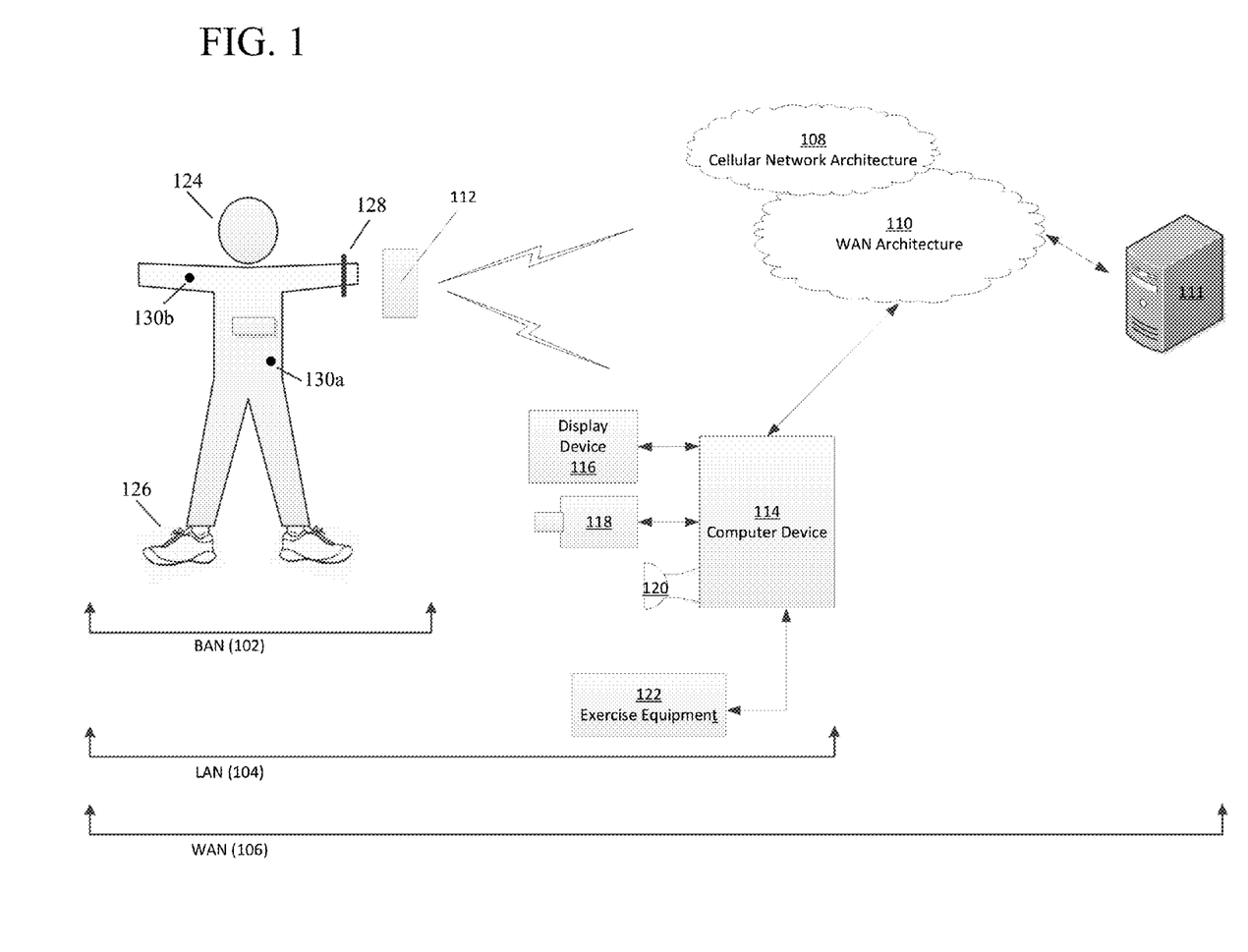
FIG. 1 illustrates an example system that may be configured to provide personal training and/or obtain data from the physical movements of a user in accordance with example embodiments.

Aspects of this disclosure relate to systems and methods that may be utilized across a plurality of networks. In this regard, certain embodiments may be configured to adapt to dynamic network environments. Further embodiments may be operable in differing discrete network environments. FIG. 1 illustrates an example of a personal training system 100 in accordance with example embodiments. Example system 100 may include one or more interconnected networks, such as the illustrative body area network (BAN) 102, local area network (LAN) 104, and wide area network (WAN) 106. As shown in FIG. 1 (and described throughout this disclosure), one or more networks (e.g., BAN 102, LAN 104, and/or WAN 106), may overlap or otherwise be inclusive of each other. Those skilled in the art will appreciate that the illustrative networks 102-106 are logical networks that may each comprise one or more different communication protocols and/or network architectures and yet may be configured to have gateways to each other or other networks. For example, each of BAN 102, LAN 104 and/or WAN 106 may be operatively connected to the same physical network architecture, such as cellular network architecture 108 and/or WAN architecture 110. For example, portable electronic device 112, which may be considered a component of both BAN 102 and LAN 104, may comprise a network adapter or network interface card (NIC) configured to translate data and control signals into and from network messages according to one or more communication protocols, such as the Transmission Control Protocol (TCP), the Internet Protocol (IP), and the User Datagram Protocol (UDP) through one or more of architectures 108 and/or 110. These protocols are well known in the art, and thus will not be discussed here in more detail.

Network architectures 108 and 110 may include one or more information distribution network(s), of any type(s) or topology(s), alone or in combination(s), such as for example, cable, fiber, satellite, telephone, cellular, wireless, etc. and as such, may be variously configured such as having one or more wired or wireless communication channels (including but not limited to: WiFi®, Bluetooth®, Near-Field Communication (NFC) and/or ANT technologies). Thus, any device within a network of FIG. 1, (such as portable electronic device 112 or any other device described herein) may be considered inclusive to one or more of the different logical networks 102-106. With the foregoing in mind, example components of an illustrative BAN and LAN (which may be coupled to WAN 106) will be described.

1. Example Local Area Network

LAN 104 may include one or more electronic devices, such as for example, computer device 114. Computer device 114, or any other component of system 100, may comprise a mobile terminal, such as a telephone, music player, tablet, netbook or any portable device. In other embodiments, computer device 114 may comprise a media player or recorder, desktop computer, server(s), a gaming console, such as for example, a Microsoft® XBOX, Sony® Playstation, and/or a Nintendo® Wii gaming consoles. Those skilled in the art will appreciate that these are merely example devices for descriptive purposes and this disclosure is not limited to any console or computing device.

Those skilled in the art will appreciate that the design and structure of computer device 114 may vary depending on several factors, such as its intended purpose. One example implementation of computer device 114 is provided in FIG. 2, which illustrates a block diagram of computing device 200. Those skilled in the art will appreciate that the disclosure of FIG. 2 may be applicable to any device disclosed herein. Device 200 may include one or more processors, such as processor 202-1 and 202-2 (generally referred to herein as "processors 202" or "processor 202"). Processors 202 may communicate with each other or other components via an interconnection network or bus 204. Processor 202 may include one or more processing cores, such as cores 206-1 and 206-2 (referred to herein as "cores 206" or more generally as "core 206"), which may be implemented on a single integrated circuit (IC) chip.

Figure 2:
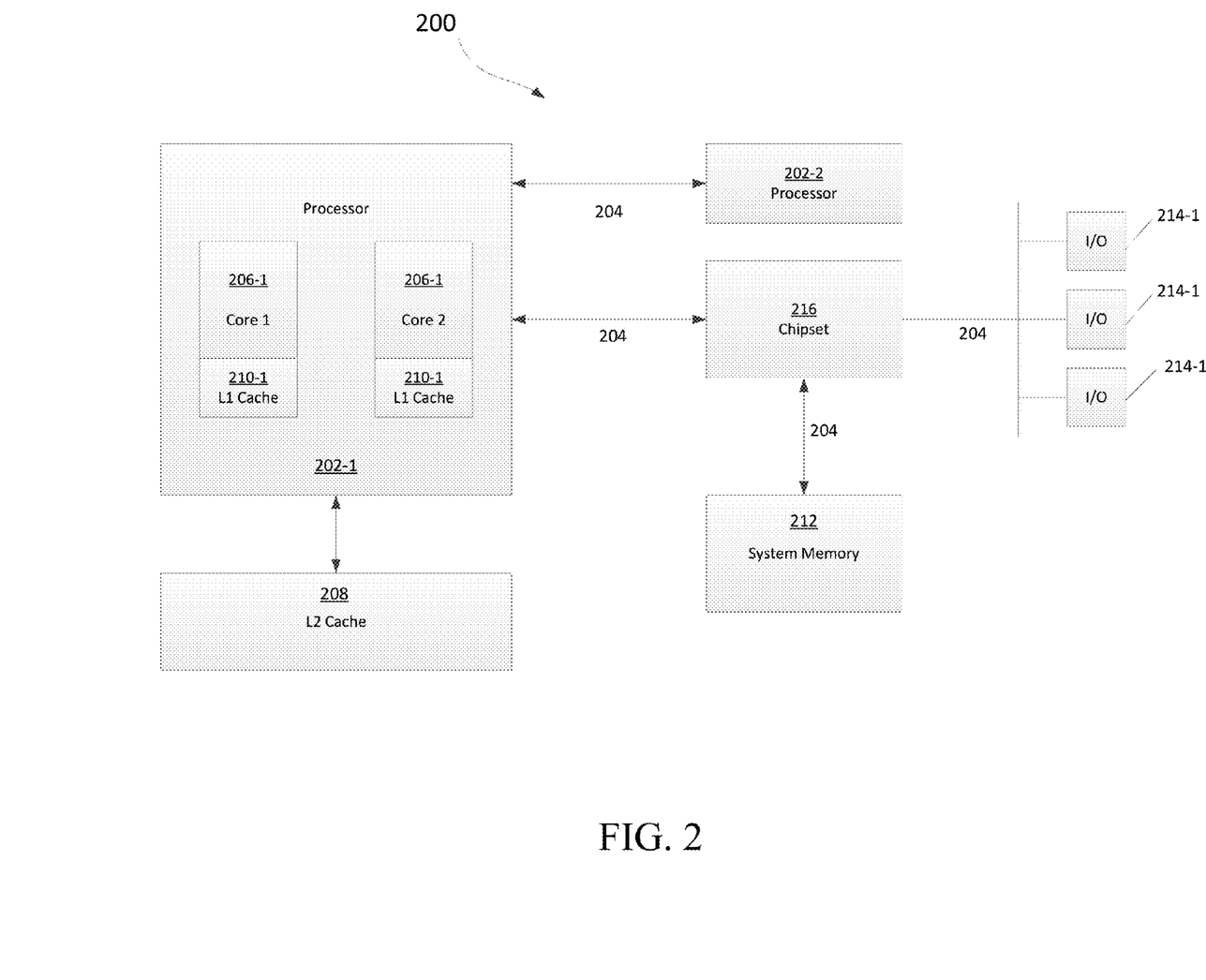
FIG. 2 illustrates an example computer device that may be part of or in communication with the system of FIG. 1.

Cores 206 may comprise a shared cache 208 and/or a private cache (e.g., caches 210-1 and 210-2, respectively). One or more caches 208/210 may locally cache data stored in a system memory, such as memory 212, for faster access by components of the processor 202. Memory 212 may be in communication with the processors 202 via a chipset 216. Cache 208 may be part of system memory 212 in certain embodiments. Memory 212 may include, but is not limited to, random access memory (RAM), read only memory (ROM), and include one or more of solid-state memory, optical or magnetic storage, and/or any other medium that can be used to store electronic information. Yet other embodiments may omit system memory 212.

System 200 may include one or more I/O devices (e.g., I/O devices 214-1 through 214-3, each generally referred to as I/O device 214). I/O data from one or more I/O devices 214 may be stored at one or more caches 208, 210 and/or system memory 212. Each of I/O devices 214 may be permanently or temporarily configured to be in operative communication with a component of system 100 using any physical or wireless communication protocol.

Returning to FIG. 1, four example I/O devices (shown as elements 116-122) are shown as being in communication with computer device 114. Those skilled in the art will appreciate that one or more of devices 116-122 may be stand-alone devices or may be associated with another device besides computer device 114. For example, one or more I/O devices may be associated with or interact with a component of BAN 102 and/or WAN 106. I/O devices 116-122 may include, but are not limited to athletic data acquisition units, such as for example, sensors. One or more I/O devices may be configured to sense, detect, and/or measure an athletic parameter from a user, such as user 124. Examples include, but are not limited to: an accelerometer, a gyroscope, a location-determining device (e.g., GPS), light (including non-visible light) sensor, temperature sensor (including ambient temperature and/or body temperature), sleep pattern sensors, heart rate monitor, image-capturing sensor, moisture sensor, force sensor, compass, angular rate sensor, and/or combinations thereof among others.

In further embodiments, I/O devices 116-122 may be used to provide an output (e.g., audible, visual, or tactile cue) and/or receive an input, such as a user input from athlete 124. Example uses for these illustrative I/O devices are provided below, however, those skilled in the art will appreciate that such discussions are merely descriptive of some of the many options within the scope of this disclosure. Further, reference to any data acquisition unit, I/O device, or sensor is to be interpreted disclosing an embodiment that may have one or more I/O device, data acquisition unit, and/or sensor disclosed herein or known in the art (either individually or in combination).

Information from one or more devices (across one or more networks) may be used to provide (or be utilized in the formation of) a variety of different parameters, metrics or physiological characteristics including but not limited to: motion parameters, such as speed, acceleration, distance, steps taken, direction, relative movement of certain body portions or objects to others, or other motion parameters which may be expressed as angular rates, rectilinear rates or combinations thereof, physiological parameters, such as calories, heart rate, sweat detection, effort, oxygen consumed, oxygen kinetics, and other metrics which may fall within one or more categories, such as: pressure, impact forces, information regarding the athlete, such as height, weight, age, demographic information and combinations thereof.

System 100 may be configured to transmit and/or receive athletic data, including the parameters, metrics, or physiological characteristics collected within system 100 or otherwise provided to system 100. As one example, WAN 106 may comprise server 111. Server 111 may have one or more components of system 200 of FIG. 2. In one embodiment, server 111 comprises at least a processor and a memory, such as processor 206 and memory 212. Server 111 may be configured to store computer-executable instructions on a non-transitory computer-readable medium. The instructions may comprise athletic data, such as raw or processed data collected within system 100. System 100 may be configured to transmit data, such as energy expenditure points, to a social networking website or host such a site. Server 111 may be utilized to permit one or more users to access and/or compare athletic data. As such, server 111 may be configured to transmit and/or receive notifications based upon athletic data or other information.

Returning to LAN 104, computer device 114 is shown in operative communication with a display device 116, an image-capturing device 118, sensor 120 and exercise device 122, which are discussed in turn below with reference to example embodiments. In one embodiment, display device 116 may provide audio-visual cues to athlete 124 to perform a specific athletic movement. The audio-visual cues may be provided in response to computer-executable instruction executed on computer device 114 or any other device, including a device of BAN 102 and/or WAN. Display device 116 may be a touchscreen device or otherwise configured to receive a user-input.

In one embodiment, data may be obtained from image-capturing device 118 and/or other sensors, such as sensor 120, which may be used to detect (and/or measure) athletic parameters, either alone or in combination with other devices, or stored information. Image-capturing device 118 and/or sensor 120 may comprise a transceiver device. In one embodiment sensor 128 may comprise an infrared (IR), electromagnetic (EM) or acoustic transceiver. For example, image-capturing device 118, and/or sensor 120 may transmit waveforms into the environment, including towards the direction of athlete 124 and receive a "reflection" or otherwise detect alterations of those released waveforms. Those skilled in the art will readily appreciate that signals corresponding to a multitude of different data spectrums may be utilized in accordance with various embodiments. In this regard, devices 118 and/or 120 may detect waveforms emitted from external sources (e.g., not system 100). For example, devices 118 and/or 120 may detect heat being emitted from user 124 and/or the surrounding environment. Thus, image-capturing device 126 and/or sensor 128 may comprise one or more thermal imaging devices. In one embodiment, image-capturing device 126 and/or sensor 128 may comprise an IR device configured to perform range phenomenology.

In one embodiment, exercise device 122 may be any device configurable to permit or facilitate the athlete 124 performing a physical movement, such as for example a treadmill, step machine, etc. There is no requirement that the device be stationary. In this regard, wireless technologies permit portable devices to be utilized, thus a bicycle or other mobile exercising device may be utilized in accordance with certain embodiments. Those skilled in the art will appreciate that equipment 122 may be or comprise an interface for receiving an electronic device containing athletic data performed remotely from computer device 114. For example, a user may use a sporting device (described below in relation to BAN 102) and upon returning home or the location of equipment 122, download athletic data into element 122 or any other device of system 100. Any I/O device disclosed herein may be configured to receive activity data.

2. Body Area Network

BAN 102 may include two or more devices configured to receive, transmit, or otherwise facilitate the collection of athletic data (including passive devices). Exemplary devices may include one or more data acquisition units, sensors, or devices known in the art or disclosed herein, including but not limited to I/O devices 116-122. Two or more components of BAN 102 may communicate directly, yet in other embodiments, communication may be conducted via a third device, which may be part of BAN 102, LAN 104, and/or WAN 106. One or more components of LAN 104 or WAN 106 may form part of BAN 102. In certain implementations, whether a device, such as portable device 112, is part of BAN 102, LAN 104, and/or WAN 106, may depend on the athlete's proximity to an access point to permit communication with mobile cellular network architecture 108 and/or WAN architecture 110. User activity and/or preference may also influence whether one or more components are utilized as part of BAN 102. Example embodiments are provided below.

User 124 may be associated with (e.g., possess, carry, wear, and/or interact with) any number of devices, such as portable device 112, shoe-mounted device 126, wrist-worn device 128 and/or a sensing location, such as sensing location 130, which may comprise a physical device or a location that is used to collect information. One or more devices 112, 126, 128, and/or 130 may not be specially designed for fitness or athletic purposes. Indeed, aspects of this disclosure relate to utilizing data from a plurality of devices, some of which are not fitness devices, to collect, detect, and/or measure athletic data. In certain embodiments, one or more devices of BAN 102 (or any other network) may comprise a fitness or sporting device that is specifically designed for a particular sporting use. As used herein, the term "sporting device" includes any physical object that may be used or implicated during a specific sport or fitness activity. Exemplary sporting devices may include, but are not limited to: golf balls, basketballs, baseballs, soccer balls, footballs, powerballs, hockey pucks, weights, bats, clubs, sticks, paddles, mats, and combinations thereof. In further embodiments, exemplary fitness devices may include objects within a sporting environment where a specific sport occurs, including the environment itself, such as a goal net, hoop, backboard, portions of a field, such as a midline, outer boundary marker, base, and combinations thereof.

In this regard, those skilled in the art will appreciate that one or more sporting devices may also be part of (or form) a structure and vice-versa, a structure may comprise one or more sporting devices or be configured to interact with a sporting device. For example, a first structure may comprise a basketball hoop and a backboard, which may be removable and replaced with a goal post. In this regard, one or more sporting devices may comprise one or more sensors, such as one or more of the sensors discussed above in relation to FIGS. 1-3, that may provide information utilized, either independently or in conjunction with other sensors, such as one or more sensors associated with one or more structures. For example, a backboard may comprise a first sensor configured to measure a force and a direction of the force by a basketball upon the backboard and the hoop may comprise a second sensor to detect a force. Similarly, a golf club may comprise a first sensor configured to detect grip attributes on the shaft and a second sensor configured to measure impact with a golf ball.

Looking to the illustrative portable device 112, it may be a multi-purpose electronic device, that for example, includes a telephone or digital music player, including an IPOD®, IPAD®, or iPhone®, brand devices available from Apple, Inc. of Cupertino, Calif. or Zune® or Microsoft® Windows devices available from Microsoft of Redmond, Wash. As known in the art, digital media players can serve as an output device, input device, and/or storage device for a computer. Device 112 may be configured as an input device for receiving raw or processed data collected from one or more devices in BAN 102, LAN 104, or WAN 106. In one or more embodiments, portable device 112 may comprise one or more components of computer device 114. For example, portable device 112 may be include a display 116, image-capturing device 118, and/or one or more data acquisition devices, such as any of the I/O devices 116-122 discussed above, with or without additional components, so as to comprise a mobile terminal.

a. Illustrative Apparel/Accessory Sensors

In certain embodiments, I/O devices may be formed within or otherwise associated with user's 124 clothing or accessories, including a watch, armband, wristband, necklace, shirt, shoe, or the like. These devices may be configured to monitor athletic movements of a user. It is to be understood that they may detect athletic movement during user's 124 interactions with computer device 114 and/or operate independently of computer device 114 (or any other device disclosed herein). For example, one or more devices in BAN 102 may be configured to function as an all-day activity monitor that measures activity regardless of the user's proximity or interactions with computer device 114. It is to be further understood that the sensory system 302 shown in FIG. 3 and the device assembly 400 shown in FIG. 4, each of which are described in the following paragraphs, are merely illustrative examples.

i. Shoe-Mounted Device

Figure 3:
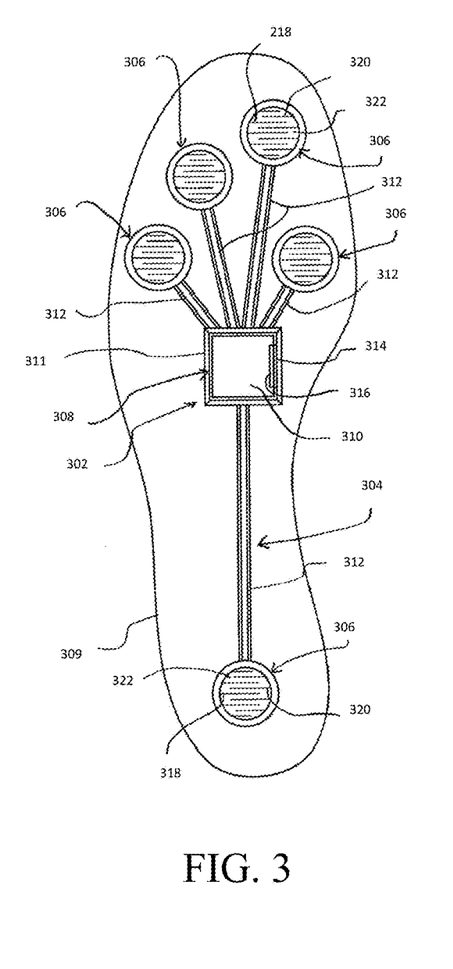
FIG. 3 shows an illustrative sensor assembly that may be worn by a user in accordance with example embodiments.

In certain embodiments, device 126 shown in FIG. 1, may comprise footwear which may include one or more sensors, including but not limited to those disclosed herein and/or known in the art. FIG. 3 illustrates one example embodiment of a sensor system 302 providing one or more sensor assemblies 304. Assembly 304 may comprise one or more sensors, such as for example, an accelerometer, gyroscope, location-determining components, force sensors and/or or any other sensor disclosed herein or known in the art. In the illustrated embodiment, assembly 304 incorporates a plurality of sensors, which may include force-sensitive resistor (FSR) sensors 306; however, other sensor(s) may be utilized. Port 308 may be positioned within a sole structure 309 of a shoe, and is generally configured for communication with one or more electronic devices. Port 308 may optionally be provided to be in communication with an electronic module 310, and the sole structure 309 may optionally include a housing 311 or other structure to receive the module 310. The sensor system 302 may also include a plurality of leads 312 connecting the FSR sensors 306 to the port 308, to enable communication with the module 310 and/or another electronic device through the port 308. Module 310 may be contained within a well or cavity in a sole structure of a shoe, and the housing 311 may be positioned within the well or cavity. In one embodiment, at least one gyroscope and at least one accelerometer are provided within a single housing, such as module 310 and/or housing 311. In at least a further embodiment, one or more sensors are provided that, when operational, are configured to provide directional information and angular rate data. The port 308 and the module 310 include complementary interfaces 314, 316 for connection and communication.

In certain embodiments, at least one force-sensitive resistor 306 shown in FIG. 3 may contain first and second electrodes or electrical contacts 318, 320 and a force-sensitive resistive material 322 disposed between the electrodes 318, 320 to electrically connect the electrodes 318, 320 together. When pressure is applied to the force-sensitive material 322, the resistivity and/or conductivity of the force-sensitive material 322 changes, which changes the electrical potential between the electrodes 318, 320. The change in resistance can be detected by the sensor system 302 to detect the force applied on the sensor 316. The force-sensitive resistive material 322 may change its resistance under pressure in a variety of ways. For example, the force-sensitive material 322 may have an internal resistance that decreases when the material is compressed. Further embodiments may utilize "volume-based resistance", which may be implemented through "smart materials." As another example, the material 322 may change the resistance by changing the degree of surface-to-surface contact, such as between two pieces of the force sensitive material 322 or between the force sensitive material 322 and one or both electrodes 318, 320. In some circumstances, this type of force-sensitive resistive behavior may be described as "contact-based resistance."

ii. Wrist-Worn Device

Figure 4:
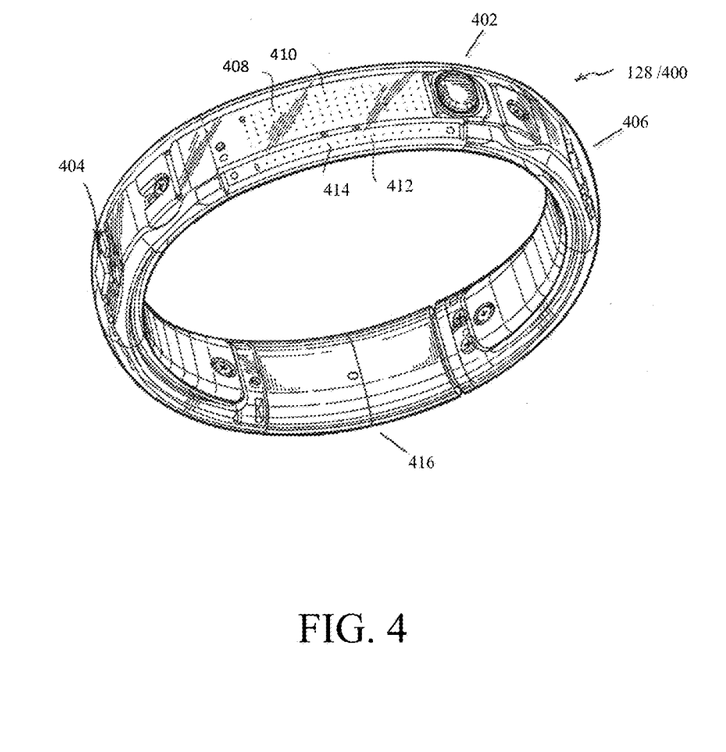
FIG. 4 shows another example sensor assembly that may be worn by a user in accordance with example embodiments.

As shown in FIG. 4, device 400 (which may resemble or comprise sensory device 128 shown in FIG. 1), may be configured to be worn by user 124, such as around a wrist, arm, ankle, neck or the like. Device 400 may include an input mechanism, such as a depressible input button 402 configured to be used during operation of the device 400. The input button 402 may be operably connected to a controller 404 and/or any other electronic components, such as one or more of the elements discussed in relation to computer device 114 shown in FIG. 1. Controller 404 may be embedded or otherwise part of housing 406. Housing 406 may be formed of one or more materials, including elastomeric components and comprise one or more displays, such as display 408. The display may be considered an illuminable portion of the device 400. The display 408 may include a series of individual lighting elements or light members such as LED lights 410. The lights may be formed in an array and operably connected to the controller 404. Device 400 may include an indicator system 412, which may also be considered a portion or component of the overall display 408. Indicator system 412 can operate and illuminate in conjunction with the display 408 (which may have pixel member 414) or completely separate from the display 408. The indicator system 412 may also include a plurality of additional lighting elements or light members, which may also take the form of LED lights in an exemplary embodiment. In certain embodiments, indicator system may provide a visual indication of goals, such as by illuminating a portion of lighting members of indicator system 412 to represent accomplishment towards one or more goals. Device 400 may be configured to display data expressed in terms of activity points or currency earned by the user based on the activity of the user, either through display 408 and/or indicator system 412.

A fastening mechanism 416 can be disengaged wherein the device 400 can be positioned around a wrist or portion of the user 124 and the fastening mechanism 416 can be subsequently placed in an engaged position. In one embodiment, fastening mechanism 416 may comprise an interface, including but not limited to a USB port, for operative interaction with computer device 114 and/or devices, such as devices 120 and/or 112. In certain embodiments, fastening member may comprise one or more magnets. In one embodiment, fastening member may be devoid of moving parts and rely entirely on magnetic forces.

In certain embodiments, device 400 may comprise a sensor assembly (not shown in FIG. 4). The sensor assembly may comprise a plurality of different sensors, including those disclosed herein and/or known in the art. In an example embodiment, the sensor assembly may comprise or permit operative connection to any sensor disclosed herein or known in the art. Device 400 and or its sensor assembly may be configured to receive data obtained from one or more external sensors.

iii. Apparel and/or Body Location Sensing

Element 130 of FIG. 1 shows an example sensory location which may be associated with a physical apparatus, such as a sensor, data acquisition unit, or other device. Yet in other embodiments, it may be a specific location of a body portion or region that is monitored, such as via an image capturing device (e.g., image capturing device 118). In certain embodiments, element 130 may comprise a sensor, such that elements 130a and 130b may be sensors integrated into apparel, such as athletic clothing. Such sensors may be placed at any desired location of the body of user 124. Sensors 130a/b may communicate (e.g., wirelessly) with one or more devices (including other sensors) of BAN 102, LAN 104, and/or WAN 106. In certain embodiments, passive sensing surfaces may reflect waveforms, such as infrared light, emitted by image-capturing device 118 and/or sensor 120. In one embodiment, passive sensors located on user's 124 apparel may comprise generally spherical structures made of glass or other transparent or translucent surfaces which may reflect waveforms. Different classes of apparel may be utilized in which a given class of apparel has specific sensors configured to be located proximate to a specific portion of the user's 124 body when properly worn. For example, golf apparel may include one or more sensors positioned on the apparel in a first configuration and yet soccer apparel may include one or more sensors positioned on apparel in a second configuration.

Figure 5:
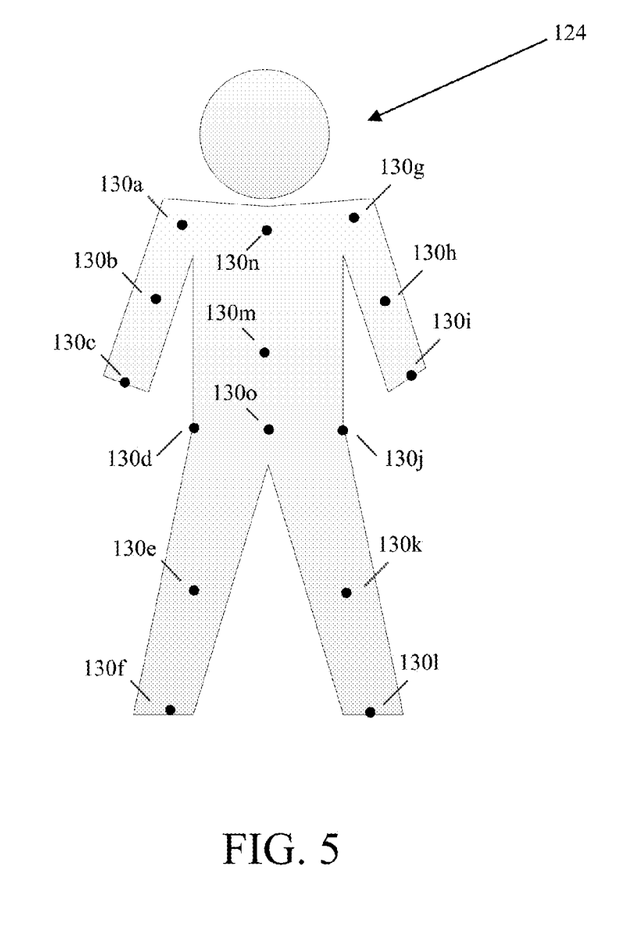
FIG. 5 shows illustrative locations for sensory input which may include physical sensors located on/in a user's clothing and/or be based upon identification of relationships between two moving body parts of the user.

FIG. 5 shows illustrative locations for sensory input (see, e.g., sensory locations 130a-130o). In this regard, sensors may be physical sensors located on/in a user's clothing, yet in other embodiments, sensor locations 130a-130o may be based upon identification of relationships between two moving body parts. For example, sensor location 130a may be determined by identifying motions of user 124 with an image-capturing device, such as image-capturing device 118. Thus, in certain embodiments, a sensor may not physically be located at a specific location (such as one or more of sensor locations 130a-130o), but is configured to sense properties of that location, such as with image-capturing device 118 or other sensor data gathered from other locations. In this regard, the overall shape or portion of a user's body may permit identification of certain body parts. Regardless of whether an image-capturing device is utilized and/or a physical sensor located on the user 124, and/or using data from other devices, (such as sensory system 302), device assembly 400 and/or any other device or sensor disclosed herein or known in the art is utilized, the sensors may sense a current location of a body part and/or track movement of the body part. In one embodiment, sensory data relating to location 130m may be utilized in a determination of the user's center of gravity (a.k.a, center of mass). For example, relationships between location 130a and location(s) 130f/130l with respect to one or more of location(s) 130m-130o may be utilized to determine if a user's center of gravity has been elevated along the vertical axis (such as during a jump) or if a user is attempting to "fake" a jump by bending and flexing their knees. In one embodiment, sensor location 1306n may be located at about the sternum of user 124. Likewise, sensor location 130o may be located approximate to the naval of user 124. In certain embodiments, data from sensor locations 130m-130o may be utilized (alone or in combination with other data) to determine the center of gravity for user 124. In further embodiments, relationships between multiple sensor locations, such as sensors 130m-130o, may be utilized in determining orientation of the user 124 and/or rotational forces, such as twisting of user's 124 torso. Further, one or more locations, such as location(s), may be utilized as (or approximate) a center of moment location. For example, in one embodiment, one or more of location(s) 130m-130o may serve as a point for a center of moment location of user 124. In another embodiment, one or more locations may serve as a center of moment of specific body parts or regions.

Gaming Platform Reward System

As will be discussed in more detail below, various embodiments of this disclosure may employ a gaming platform configured to provide a reward to a user based upon the performance achieved within a virtual environment, such as a videogame environment. As such, the described gaming platform may be a device that is dedicated to providing videogame functionality to a user, and otherwise referred to as a games console. In another implementation, a gaming platform may be implemented on a general-purpose computing hardware configured to provide functionality beyond the execution of one or more videogame processes. As such, a gaming platform may be referred to, in the alternative, as an activity simulation device, or simply as a computing system, without departing from the scope of the disclosures described herein. Accordingly, those of ordinary skill in the art will recognize various different videogame examples that may be utilized without departing from the disclosures described herein. As such, the systems and methods described herein may generally be utilized to provide a reward to user based upon any one or more performance metrics associated with a videogame, or another virtual simulation type. In this way, a gaming platform may be configured to display a virtual environment that is directed towards one or more virtual sporting events. In certain specific examples, a videogame, or activity simulation, may include one or more of a virtual basketball game, baseball game, football game, soccer game, ice hockey game, tennis match, cycling race, running race, or car race, among many others. In another example, the gaming platform may be configured to process and display one or more virtual activities other than sporting activities. For example, a gaming platform may be configured to generate a virtual environment for watching one or more video clips, movies and/or TV shows, and the like.

In one example, a gaming platform may be configured to display a videogame, or activity simulation, on a display device, such as display device 116. In another example, a gaming platform may receive inputs, otherwise referred to as control inputs, from one or more users. Accordingly, in response to one or more control inputs, a gaming platform may communicate a response to the user as a displayed motion of one or more virtual avatars, or other elements, within a virtual environment of a videogame or activity simulation. In this way, one or more control inputs may be utilized to control an action of one or more virtual avatars, or to control the displayed behavior of other virtual representations of controllable elements (e.g. to control a displayed vehicle).

In one example, a control input may be communicated to a gaming platform using an input console (e.g. one or more buttons of a keyboard and/or a control pad). In another example, a control input may be communicated to a gaming platform based upon a detected motion of a user, as detected by an image-capturing device, such as device 118. In another example, a control input may be communicated to a gaming platform based upon motion data detected by a sensor, such as sensor 120. In yet another example, a control input may be communicated to a gaming platform based upon a signal outputted from a piece of sports equipment being used by a user, such as equipment 122. In certain specific examples, the sports equipment may include a treadmill, an exercise bike, a weight lifting machine, or another piece of stationary exercise equipment. As such, these stationary exercise equipment examples may comprise one or more sensors configured to output signals corresponding to a level of exertion/energy consumption of a user, a distance traveled by the user, a level of improvement of a user based on a previous personal best, among others. In one implementation, sensor data outputted from a piece of exercise equipment may be received by a gaming platform device in order to control one or more virtual avatars and/or other virtual, controllable elements. Additionally or alternatively, the sports equipment may include one or more sports balls, clubs, rackets, or bats, among others. As such, these sports equipment examples may also be configured with one or more sensors to output sensor data corresponding to a motion of the equipment and/or a user.

In yet another example, a gaming platform may receive sensor data from a sensor device located within footwear of a user. As such, this footwear-mounted sensor may be configured to output data corresponding to a distance traveled by a user, a speed of the user, and/or a specific motion of the user, among others. In turn, the outputted sensor data may be received by a gaming platform and interpreted as one or more control instructions to control one or more virtual avatars/controllable elements of a videogame.

In one example, one or more elements of a gaming platform may be implemented using dedicated electronic hardware. In another example, one or more additional or alternative elements of a gaming platform may be implemented by executing computer-executable instructions on a programmable computing device. Accordingly a gaming platform may utilize one or more elements of device 200, as schematically depicted FIG. 2. In this way, processor 202 may be configured to execute videogame and/or activity simulation processes, and may be configured to receive control input instructions from one or more interfaces 214.

Figure 6:
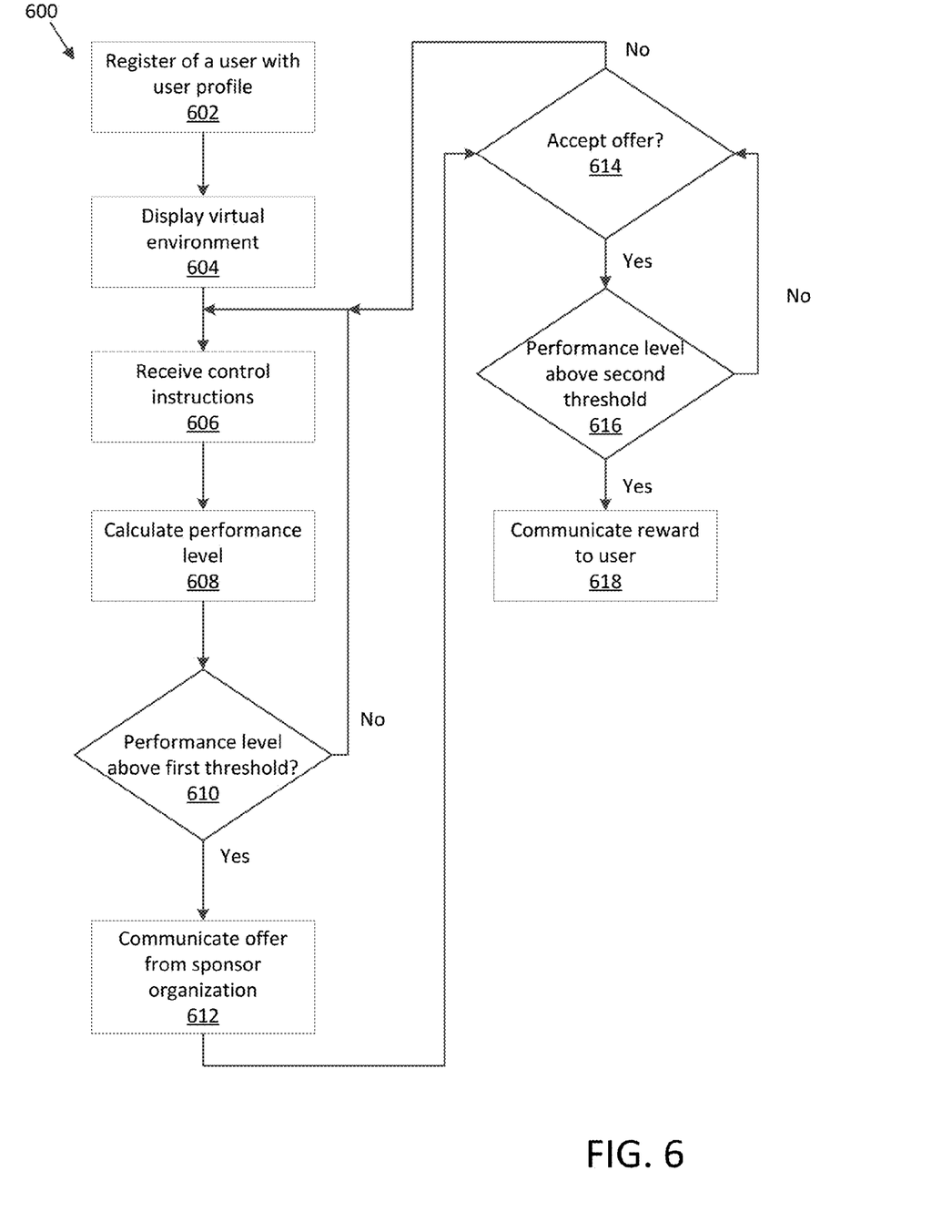
FIG. 6 is a flowchart diagram of a process for communicating a reward to user based upon a performance within a gaming environment.

FIG. 6 is a flowchart diagram of a process 600 that may be used to communicate a reward to a user based upon a performance within a gaming environment, otherwise referred to as a videogame environment, provided by a gaming platform, or activity simulation device, among others. In one example, and as previously described, a videogame environment may depict a virtual representation of a sporting activity, among others. However, those of ordinary skill in the art will recognize that the disclosures described herein should not be limited to gaming environments related to sporting activities. As such, a gaming platform, or computing device, as described herein, may be utilized to execute a videogame or an activity simulation that may include any activity that may be represented in a virtual environment, without departing from the scope of the disclosures described herein. In one example, a user's virtual progression through a videogame may be measured based upon one or more of a plurality of parameters. Accordingly, one or more of the plurality of parameters may include one or more goals that may be achieved by controlling one or more virtual avatars and/or other virtual elements. As such, the description that follows may generally refer to a virtual game environment, or videogame, that may be utilized to communicate a reward to a user, based upon a performance within the videogame. In another example, this disclosure may be utilized with a combination of videogames, such that a common user profile may be utilized to calculate a performance level, based upon progress within a combination of multiple videogames.

In one implementation, process 600 may be executed by one or more computing devices, such as device 200. Accordingly, device 200 may be referred to as an activity simulation device 200, or alternatively, a gaming platform 200, a videogame device 200, or a computing device 200. As such, in one example, process 600 may register a user with a user profile to be utilized in a videogame environment. In this way, gaming platform 200 may request one or more login details from a user in order to verify an identity of a user, and to associate said user with a user account stored in, or accessible from, the gaming platform 200. Those of ordinary skill in the art will recognize that this user profile may comprise one or more pieces of biographic information associated with the user, including, among others, one or more names of the user, a mailing address, one or more email addresses, one or more links to one or more social networks, and/or a date of birth, among others. Additionally or alternatively, the user profile may store (e.g. in system memory 212) information associated with activities undertaken by the user in the past. As such, the user profile may store high-score, goal, and/or achievement information associated with a videogame previously participated in by the user. As such, the user profile may store one or more metrics used to track achievement within a videogame, and the like. Further, those of ordinary skill in the art will recognize that a user may register with a user profile using one or more login credentials, including, among others, one or more passwords. In one example, process 600 the described registration of a user with a user profile associated with a gaming platform configured to provide the user with a virtual progression through a plurality of related sporting events may be executed at block 602 of process 600.

In one example, a videogame may be customized based upon one or more user preferences. As such, user preferences may include, among others, details related to one or more virtual avatars to be controlled within a videogame environment, and specifically, may include details related to a performance level associated with a virtual avatar and/or the user of the videogame. In one example, a performance level may be associated with a level of difficulty of a videogame and/or a level of progress through the videogame, among others. As such, the videogame device 200 may execute one or more processes to display a videogame based upon a recognized user profile. Furthermore, in one example, the videogame device 200 may execute these processes to display the videogame at block 604 of process 600. In one specific example, a level of progress through a basketball videogame may correspond to a number of games played in a virtual basketball season, and the like.

In one implementation, a gaming platform 200 may be configured to receive control instructions, or input control data, from one or more sources. As such, these sources may include a game controller comprising one or more physical actuators (e.g. buttons and/or joysticks, among others). Additionally or alternatively, the input sources may include one or more sensor devices configured to be worn on a user, and/or configured to detect a motion of a user remotely. As such, the input sources to the videogame device 200 may include one or more of devices 112, 118, 126, 128, and/or 130, without departing from the scope of the disclosures described herein. Additionally or alternatively, control input data may be received by the videogame device 200 from exercise equipment, such as equipment 122. In this way, a user may control one or more actions of a virtual element within a videogame based upon manually-inputted commands, using one or more buttons of a control pad/keyboard and/or sensor data generated based upon a motion/an activity/an exercise being performed by the user. As such, in one example, a gaming platform 200 may receive control instructions at block 606 of process 600.

In another example, a gaming platform 200 may be configured to execute one or more processes to calculate a performance level associated with the user profile within of a videogame. As such, and as previously described, the performance level may represent a level of achievement associated with the videogame (e.g. a number of virtual sporting games won during a virtual sporting season, or a points total in a virtual sporting game, among many others). In another example, a performance level may represent one or more statistics associated with a user profile, as recorded based upon actions within a videogame. In one specific example, for a basketball videogame, one or more statistics may correspond to assists, blocks, rebounds, shots, time played, opponent played, steals, points scored, turnovers, among others. As such, a gaming platform 200 may calculate a performance level based upon one or more of the statistics. Further, those of ordinary skill in the art will recognize that various additional or alternative statistics may be utilized with a different videogames in order to calculate a performance level associated with a user profile. Accordingly, a user's virtual progression through a plurality of related sporting events within a videogame environment may be measured using a plurality of parameters. One or more of this plurality of parameters may be used to calculate a performance level at block 608 of process 600.

In one implementation, a gaming platform 200 may execute one or more processes to check whether a calculated performance level is above a threshold level. As such, in one example, this threshold level may be associated with statistics specific to a videogame that represent a high level of achievement. Further, those of ordinary skill in the art will recognize that any given threshold level it may be utilized with this disclosure. As such, this check may be carried out at block 610 of process 600. If, in one example, the performance level is not above the threshold, process 600 may return to block 606. If, however, a calculated performance level is above the threshold, process 600 may proceed, in one example, to block 612.

In one implementation, a videogame displayed by a gaming platform 200 may be configured to generate one or more sponsorship offers, otherwise referred to as virtual awards, to a user based upon an achieved performance level. As such, the generated sponsorship offers may comprise offers to associate a user profile and/or one or more virtual avatars associated with the user, with one or more companies. In particular, a sponsorship offer may comprise an option to augment an appearance and/or a performance of a virtual avatar and/or other virtual elements with apparel and/or equipment associated with a sponsor company. In one implementation, a sponsorship offer may comprise an option to outfit one or more virtual avatars and/or one or more other virtual elements with one or more virtual representations of real-world products. In one specific example, a sponsorship offer may include an offer to outfit one or more players and/or a team represented within a videogame with apparel manufactured by a specific sports company, and the like. As such, in one example, an offer from one or more sponsor organizations may be provided to a user at block 612 of process 600.

In one example, a user may be presented with an option to accept or decline a virtual sponsorship offer presented at block 612. As such, in one implementation, this option of accepting or declining one or more sponsorship offers may be executed at decision block 614. Accordingly, if a user declines a sponsorship offer, process 600 may, in one example, return to block 606. If, however, a user accepts a sponsorship offer, process 600 may proceed to decision block 616.

Process 600 may perform a second check to determine whether a performance level associated with a user profile is above a second threshold. In this way, this second check may determine whether a user has improved one or more performance statistics following accepting sponsorship from a sponsor organization. Similar to the first threshold, the second threshold may be set as any numerical value, and the like. Specifically, in one example, the second threshold may be numerically greater than the first threshold level, and the like. In one implementation, process 600 may measure a user's virtual performance during one or more related virtual sporting events following acceptance of a virtual sponsorship offer. As such, process 600 may execute a second check of a performance level associated with a user at decision block 616. Accordingly, in one example, if process 600 determines that the performance level associated with a user profile is not above the second threshold, process 600 may proceed to block 614. If, however, it is determined that a performance level is above the second threshold, process 600 may proceed to block 618.

In one implementation, process 600 may be configured to communicate a reward to user based upon a performance of the user within a videogame environment, and the like. Specifically, process 600 may communicate an offer code, otherwise referred to as a virtual identifier, to a user based upon a performance level associated with a user profile being above the described second threshold level. In turn, the offer code may be utilized to redeem a physical product, otherwise referred to as a tangible object, associated with the accepted sponsorship organization. In one example, the offer code may be utilized to redeem a limited edition garment and/or piece of athletic equipment associated with a sport depicted within a videogame. In one example, and avatar controlled by user within a virtual gaming environment may represent an actual individual. In one example, this actual individual may be a real-life sports personality, among others. As such, the reward, or tangible object offered to a user may be a replica of a product worn by the actual individual, or an actual product worn by the actual individual. Accordingly, in one example, process 600 may communicate an offer code to the user by extracting a contact point from a user profile associated with the user. In this way, process 600 may communicate the offer code via one or more of email, a message delivered to a stored phone number, a message delivered to a physical mailing address, and/or in message delivered via one or more social networking applications and/or sites. Accordingly, in one implementation, process 600 may communicate this offer code to the user at block 618 of process 600. Further, the offer code may be communicated to a user via a communication pathway not part of the gaming platform. As such, the offer code may be communicated to a user via a separate email system, mobile phone network, or social networking website, among others. In another example, the virtual identifier may be provided to a user using an output device that is not part of the gaming platform. As such, this output device may be a smart phone, a tablet, among others.

Figure 7:
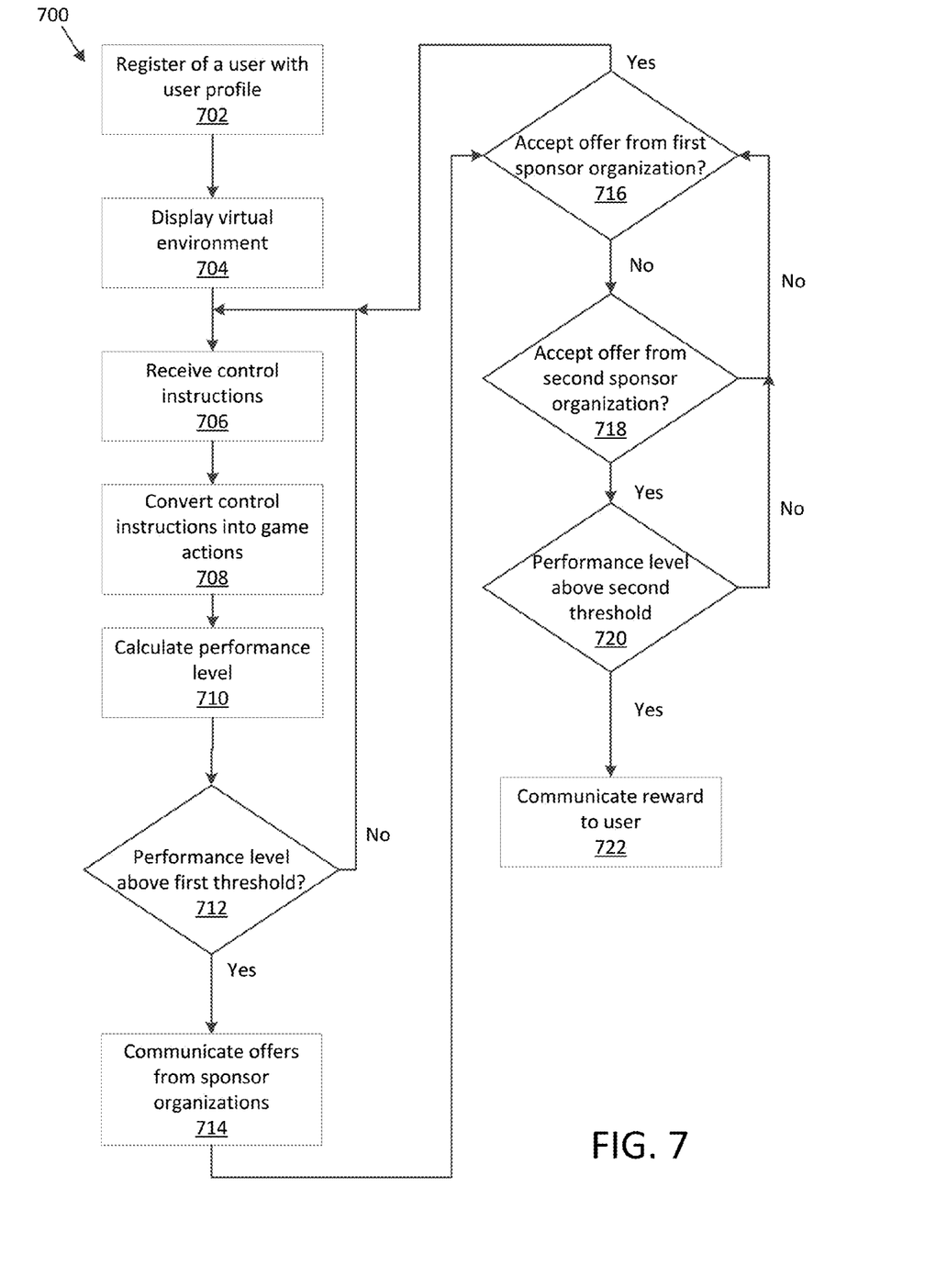
FIG. 7 is a flowchart diagram of another process for communicating a reward to the user based upon a performance within an activity simulation.

FIG. 7 is a flowchart diagram of a process 700 for communicating a reward to a user based upon a performance within an activity simulation. Similar to process 600, process 700 may be utilized with an activity simulation that is a virtual gaming environment.

In one implementation, and similar to process 600, process 700 may be executed by one or more computing devices, such as device 200 from FIG. 2. In one implementation, process 700 may register a user with a user profile associated with a videogame at block 702. Further, the computing device 200 may be configured to display the videogame at block 704, and receive control input data from a user at block 706. Additionally, process 700 may be configured to execute one or more sub-processes to translate the control input data into videogame instructions at block 708, and to calculate a performance level of the videogame at block 710.

In one example, process 700 may, at decision block 712, perform a check to determine if the calculated performance level is above a first threshold. In turn, if the performance level is above the first threshold, process 700 may proceed to block 714, wherein one or more sponsorship offers may be presented to the user through the videogame. In one example, process 700 may communicate a reward to a user based upon an association of a user profile with a specific sponsor organization in favor of one or more additional sponsor organizations. Accordingly, decision block 716 represents an offer from a first sponsor organization to the user, based upon a calculated performance level within the videogame. In one example, if the user accepts this offer from the first sponsor organization, process 700 may return to block 706. If, however, the user declines the offer from the first sponsor organization, process 700 may proceed to block 718. As such, block 718 represents another decision point at which the user is presented with a second offer from a second sponsor organization. Accordingly, in one example, if the user accepts this second offer from the second sponsor organization, process 700 may proceed to block 720.

Decision block 720 represents a check as to whether a performance level associated with the user is above a second threshold level. Similar to block 712, the second threshold level associated with decision block 720 may be implemented as any numerical level without departing from the scope of the disclosures described herein. In one specific example, the second threshold level associated with decision block 720 may be numerically greater than the first threshold level associated with block 712. Accordingly, if a performance level associated with a user profile is above the second threshold, process 700 proceeds to block 722.

In one implementation, process 700 may be configured to communicate a reward to user based upon a performance of the user within a videogame, and the like. Specifically, process 700 may communicate an offer code to a user based upon a performance level associated with a user profile being above the described second threshold level. In turn, the offer code may be utilized to redeem a physical product associated with the accepted sponsorship organization. In one example, the offer code, or virtual identifier, may be utilized to redeem a limited edition garment and/or piece of athletic equipment associated with a sport depicted within a videogame. Accordingly, in one example, process 700 may communicate an offer code to the user by extracting a contact point from a user profile associated with the user. In this way, process 700 may communicate the offer code via one or more of email, a message delivered to a stored phone number, a message delivered to a physical mailing address, and/or in message delivered via one or more social networking applications and/or sites. Accordingly, in one implementation, process 700 may communicate this offer code to the user at block 722 of process 700.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the art will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

Accordingly, it will be understood that this disclosure is not to be limited to the embodiments disclosed herein, but is to be understood from the following claims, which are to be interpreted as broadly as allowed under the law.

We claim:
1. An apparatus comprising:
a processor;
an input interface;
a memory storing computer-readable instructions that, when executed by the processor, cause the apparatus to:
display an activity simulation to a user;
register a user with a user profile associated with the activity simulation, wherein an avatar is associated with the user profile during at least a portion of a virtual progression of the user through the activity simulation;
receiving, via the input interface, one or more control inputs based on a first physical activity of the user;
augment a performance level of the activity simulation based upon the one or more control inputs;
determine, based on first data received from an activity monitoring device via one or more wireless communications, that the performance level exceeds a first threshold;
provide the user with an option, based on the performance level exceeding the first threshold, to associate the user profile with a first sponsor organization of a plurality of sponsor organizations;
responsive to a determination that the user declined to associate the user profile with the first sponsor organization, providing the user with a second option to associate the user profile with a second sponsor organization of the plurality of sponsor organizations;
responsive to a determination that the user elected to associate the user profile with the second sponsor organization:
receive second control inputs from the user;
augment a second performance level of the activity simulation based upon the second control inputs; and
determine, based on second data received from the activity monitoring device via one or more wireless communications, whether the second performance level exceeds a second threshold, wherein the second threshold is greater than the first threshold;
responsive to a determination that the second performance level exceeds the second threshold, determine a reward of a physical product associated with the avatar and the second sponsor organization; and communicate a redemption code associated with the reward to a contact point associated with the user profile.

2. The apparatus of claim 1, wherein the second sponsor organization is a sports equipment manufacturers.

3. The apparatus of claim 1, wherein the input interface comprises an activity recognition device.

4. The apparatus of claim 1, wherein the activity monitoring device comprises a sensor configured to be worn on an appendage of the user and configured to output a signal responsive to a motion of the user.

5. The apparatus of claim 1, wherein the contact point comprises one or more of an email address, a phone number, a social network account, and a physical mailing address.

6. A method for receiving a reward based on a performance in an activity simulation, comprising:
    displaying an activity simulation to a user;
    registering a user with a user profile associated with the activity simulation, wherein an avatar is associated with the user profile during at least a portion of a virtual progression of the user through the activity simulation;
    receiving first control input data based on a first physical activity of the user;
    augmenting a performance level of the activity simulation based upon the first control input data;
    determining, based on first data received from an activity monitoring device and via one or more wireless communications, that the performance level exceeds a first threshold;
    providing, based on the performance level exceeding the first threshold, the user with an option to associate the user profile with a first sponsor organization of a plurality of sponsor organizations;
    responsive to a determination that the user declined to associate the user profile with the first sponsor organization, providing the user with a second option to associate the user profile with a second sponsor organization of the plurality of sponsor organizations;
    responsive to a determination that the user elected to associate the user profile with the second sponsor organization:
    receiving second control input data from the user based on a second physical activity of the user;
    augmenting a second performance level of the activity simulation based upon the second control input data;
    determining, based on second data received from the activity monitoring device via one or more wireless communications, whether the second performance level exceeds a second threshold, wherein the second threshold is greater than the first threshold; and
        responsive to a determination that the second performance level exceeds the second threshold, determining a reward of a physical product associated with the avatar and the second sponsor organization; and
        communicating a redemption code associated with the reward to the user profile.

7. The method of claim 6, wherein the activity simulation is a simulated sporting event.

8. The method of claim 7, wherein one or more of the first control input data and the second control input data is received from a piece of sports equipment being used by the user.

9. The method of claim 6, wherein one or more of the first control input data and the second control input data is received from a gaming platform.

10. A non-transitory computer-readable medium comprising computer-executable instructions that when executed by a processor are configured to perform at least:
    displaying an activity simulation to a user;
    registering a user with a user profile associated with the activity simulation, wherein an avatar is associated with the user profile during at least a portion of a virtual progression of the user through the activity simulation;
    receiving first control input data based on a first physical activity of the user;
    augmenting a performance level of the activity simulation based upon the first control input data;
    determining, based on first data received from an activity monitoring device and via one or more wireless communications, that the performance level exceeds a first threshold;
    providing, based on the performance level exceeding the first threshold, the user with an option to associate the user profile with a first sponsor organization of a plurality of sponsor organizations;
    responsive to a determination that the user declined to associate the user profile with the first sponsor organization, providing the user with a second option to associate the user profile with a second sponsor organization of the plurality of sponsor organizations;
    responsive to a determination that the user elected to associate the user profile with the second sponsor organization:
    receiving second control input data from the user based on a second physical activity of the user;
    augmenting a second performance level of the activity simulation based upon the second control input data; and
    determining, based on second data received from the activity monitoring device via one or more wireless communications, whether the second performance level exceeds a second threshold, wherein the second threshold is greater than the first threshold;
    responsive to a determination that the second performance level exceeds the second threshold, determining a reward of a physical product associated with the avatar and the second sponsor organization; and
    communicating a redemption code associated with the reward to the user profile.

11. The non-transitory computer-readable medium of claim 10, wherein the activity simulation is a simulated sporting event.

12. The non-transitory computer-readable medium of claim 11, wherein one or more of the first control input data and the second control input data is received from a piece of sports equipment being used by the user.

13. The non-transitory computer-readable medium of claim 11, wherein one or more of the first control input data and the second control input data is received from a gaming platform.

14. The non-transitory computer-readable medium of claim 10, wherein the avatar is configured to represent an actual individual, and wherein the physical product is a replica of an actual product worn by the actual individual.

15. The non-transitory computer-readable medium of claim 10, wherein the activity monitoring device comprises an exercise machine.

16. The non-transitory computer-readable medium of claim 10, wherein the activity monitoring device comprises an input console.

17. The non-transitory computer-readable medium of claim 10, wherein the activity monitoring device comprises an accelerometer worn on an appendage of a user.

18. The non-transitory computer-readable medium of claim 10, wherein the activity monitoring device comprises a camera configured to track a motion of the user.

* * * * *